T. L. LILLY.
END GATE FOR AUTOTRUCKS.
APPLICATION FILED FEB. 15, 1919.
1,314,882. Patented Sept. 2, 1919.
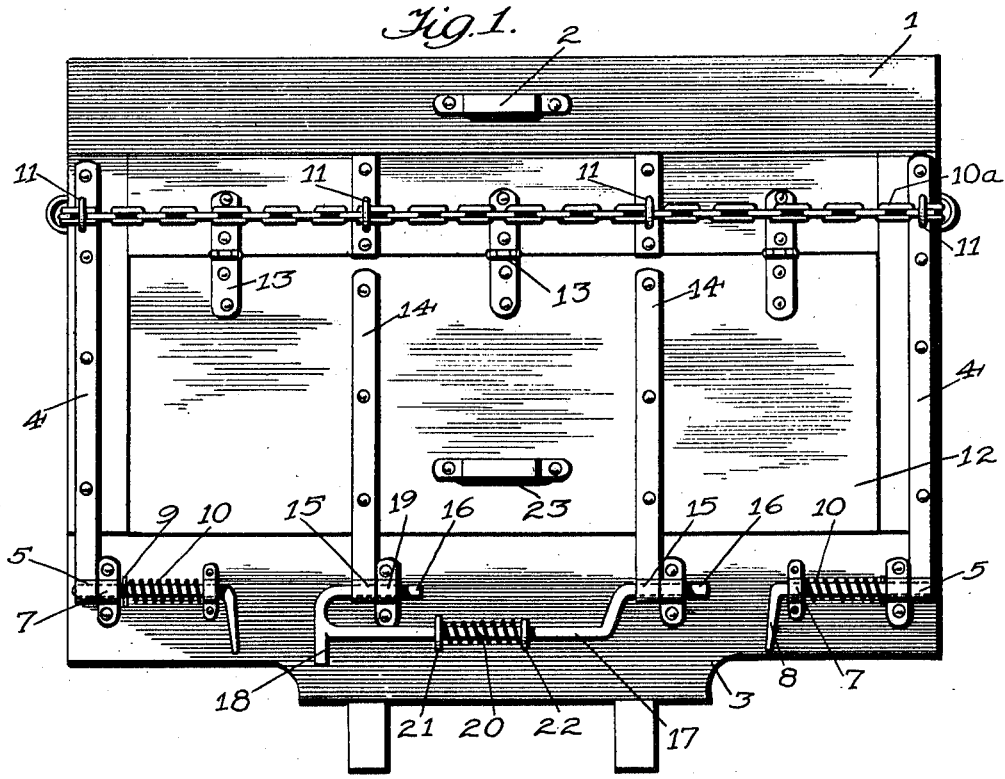
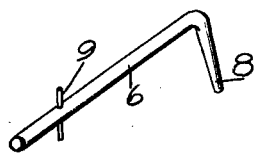
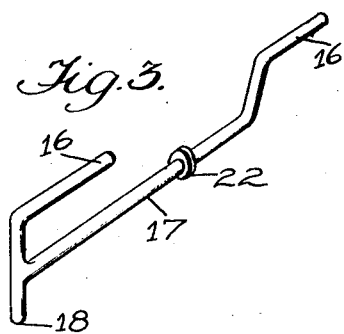
WITNESSES
George C. Myers
INVENTOR
T. L. Lilly.
BY
ATTORNEYS

UNITED STATES PATENT OFFICE.

THOMAS L. LILLY, OF MINONK, ILLINOIS.

END-GATE FOR AUTOTRUCKS.

1,314,882.  Specification of Letters Patent.  Patented Sept. 2, 1919.

Application filed February 15, 1919. Serial No. 277,233.

*To all whom it may concern:*

Be it known that I, THOMAS L. LILLY, a citizen of the United States, and a resident of Minonk, in the county of Woodford and State of Illinois, have invented certain new and useful Improvements in End-Gates for Autotrucks, of which the following is a specification.

My invention is an improvement in end gates for auto trucks, and has for its object to provide a gate of the character specified wherein an auxiliary gate is provided in connection with the main gate hinged to normally close an opening in the main gate and arranged to swing outward to permit the partial unloading of the truck to release the main end gate, when hauling gravel, grain, coal or the like.

In the drawings:

Figure 1 is a rear view of the gate;

Fig. 2 is a perspective view of one of the combination latches and pintles for the main gate;

Fig. 3 is a similar view of the latch and pintle for the auxiliary gate.

In the present embodiment of the invention the main gate 1, which is provided with a handle 2 for manipulating the same, is hinged to the truck body 3 at the lower edge of the gate, to swing outwardly with respect to the body or to swing upwardly into closed position. A strap 4 is secured to each end of the main gate, and each strap is doubled to form at its lower end a bearing 5, the bearings 5 being below the lower edge of the main gate. Each of these bearings 5 is engaged by a combined latch and pintle, consisting of a rod 6 mounted to slide in bearings 7 on the body, and each rod has at one end an angular portion 8 providing a handle for manipulating the latch and pintle.

A cross pin 9 passes through each rod near the end remote from the arm 8, and a coil spring 10 is arranged between each pin and the bearing 7 remote from the pin, the spring acting normally to force the rod toward the bearing 5 and to hold the rod in engagement with the bearing. It is obvious that the main gate may swing on these rods into open or closed position, and the gate is held closed by means of a chain 10, which passes through eyes 11 on the main gate near its top and has its ends connected with the body in any usual or desired manner. Such chains are, as a rule, arranged to permit the gate to open or to hold it entirely closed or partially closed.

The auxiliary gate 12 is arranged within an opening in the main gate at the lower end of the said main gate, and this auxiliary gate is hinged to the main gate at the upper edge of the auxiliary gate by hinges 13. Straps 14 are secured transversely of the auxiliary gate on each side of its vertical center, and each of these straps is doubled to form a bearing 15, the bearings 15 being in alinement with the bearings 5 when the parts are in normal position. These bearings 15 are adapted to be engaged by pins 16 on a combined latch and pintle consisting of a rod 17 having one end offset angularly to form one of the pins 16, and carrying at the other end the other pin 16 in spaced offset relation. The rod also carries a depending arm 18 at the last named end for convenience in handling the same, and the pins 16 are mounted to slide in bearings 19 on the main gate.

A coil spring 20 is arranged between a stop 21 on the body and a stop 22 on the rod, and the said spring acts normally to press the pins 16 into the bearings 15 and 19. This auxiliary gate has a handle 23 for convenience in manipulating the same.

In use, when it is desired to discharge a part of the load before removing the main end gate or when for any other reason it is not desired to open the main end gate to gain access to the material in the body, the rod 17 is moved longitudinally against the resistance of the spring 20, until the pins 16 are released from the bearings 19. The auxiliary gate can now be swung upwardly on the hinges 13. When it is desired to open the main end gate without detaching the same from the body, the chain 10 is released and the gate is swung down upon the hinges 5—7 and 15—19. When it is desired to remove the end gate from the wagon, the pins 16 are released in the manner above stated and the pins 6 are also released from the bearings 5, by moving the said pins inwardly against the resistance of the springs 10. The entire gate may now be removed from the body.

I claim:

In combination with the body, an end gate having an opening, and an auxiliary gate for closing the opening, said auxiliary gate being hinged at its top to the main gate, hinging leaves secured to the auxiliary gate and having bearings at their lower ends, the body having bearings alining therewith, a latch having a latch pin for engaging each pair of alining bearings, and auxiliary means connecting the main gate to the body and releasable and arranged in alinement with the first named hinges.

THOMAS L. LILLY.

Witnesses:
 NELLIE C. LILLY,
 ANDREW J. KELLY.